July 19, 1938.  A. H. WOOD  2,124,173
FLUID BRAKE
Filed Dec. 24, 1936  2 Sheets-Sheet 2
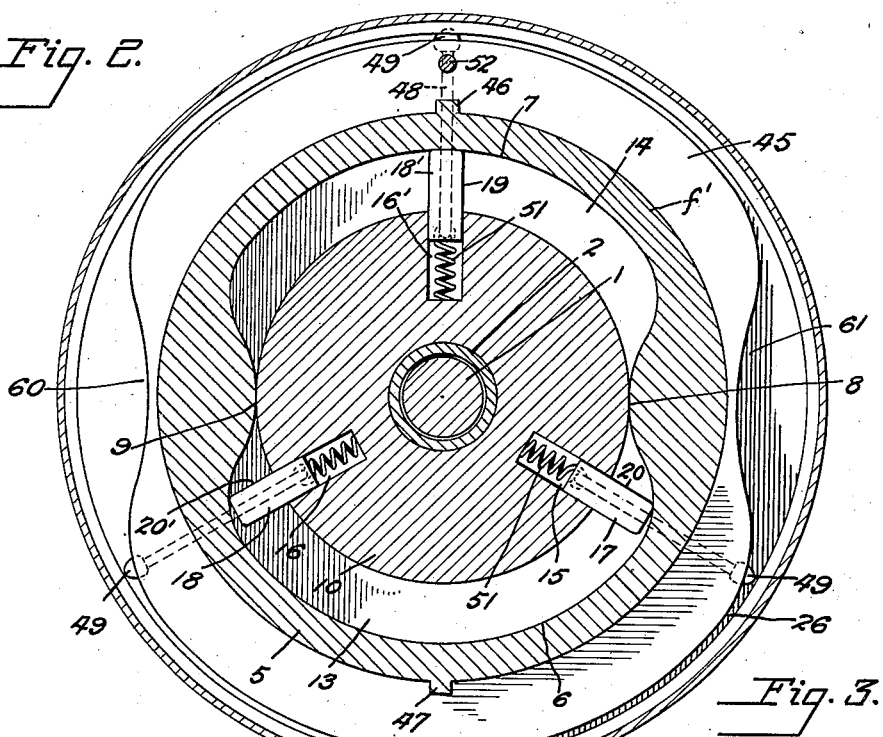
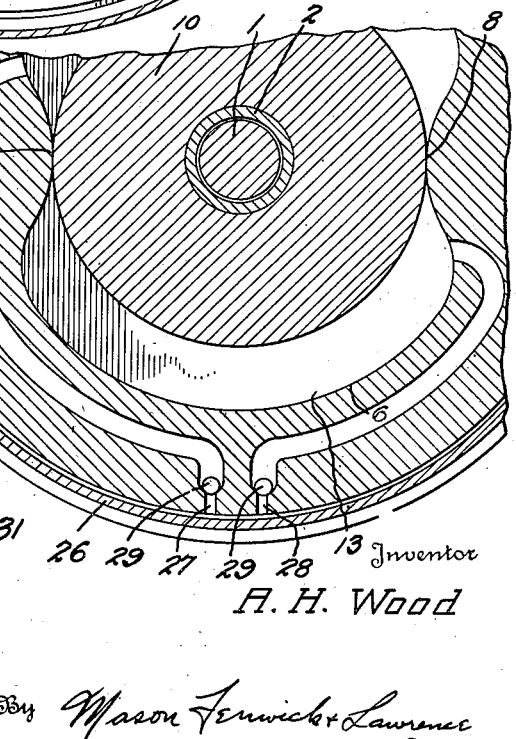
Inventor
A. H. Wood
By Mason Fenwick & Lawrence
Attorneys Patented July 19, 1938

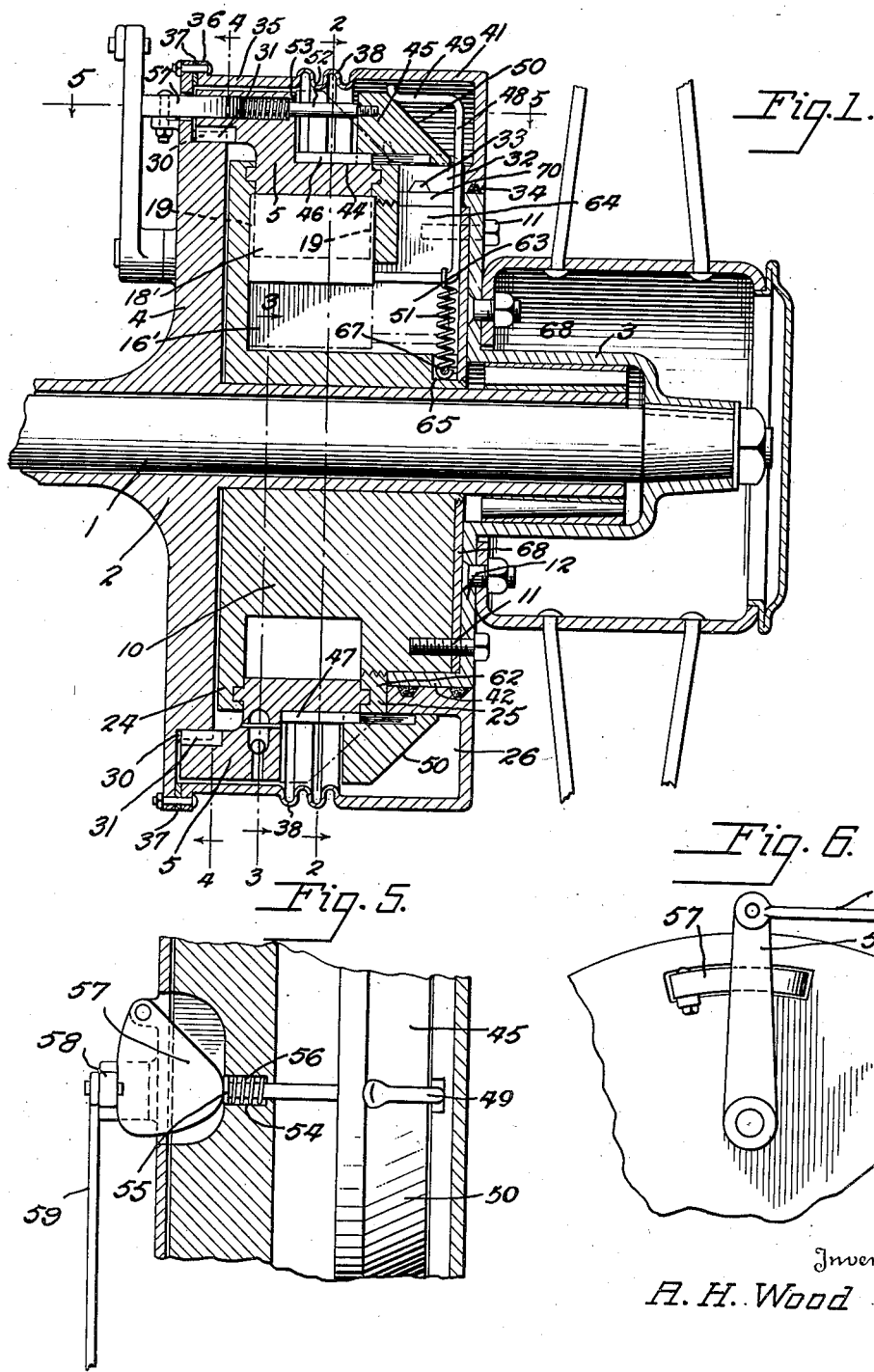

2,124,173

UNITED STATES PATENT OFFICE 2,124,173

FLUID BRAKE

Abram H. Wood, White Hall, Md.

Application December 24, 1936, Serial No. 117,647

9 Claims. (Cl. 188—90)

This invention relates to fluid brakes for auto vehicles. It has for its general object to provide a brake in which the braking effort is produced by a body of suitable liquid such as oil which normally rests between the rotating and stationary part of the brake, but which when the brake is operated becomes trapped between rotary and fixed parts with variable restriction according to the degree of application of the brake operating mechanism.

The broad concept of obtaining braking resistance by forcing oil through a by-pass of suitable restriction may not be new, but the practical application of this idea to vehicle brakes has not heretofore materialized, since that one of the essential pair of complementary brake members which rotates with the wheel necessarily partakes of small axial deviations which make it necessary that the fixed brake member shall be flexible to enable it to follow the movements of the rotatable member, otherwise a fluid-tight chamber between these members cannot be maintained. Insofar as my knowledge and observation go, no one has recognized the existence of this problem, the solution of which is one of the objects of the present invention.

Another object of the invention is to provide a fluid brake as described which in normal operation makes up any depletion of oil in the braking chamber.

A further object of the invention is to provide a fluid brake in which the braking reaction is balanced on both sides of the axis of rotation.

Other objects of the invention will appear as the following description of a preferred and practical embodiment thereof proceeds.

In the drawings throughout the several figures of which the same characters of reference have been employed to indicate identical parts:

Figure 1 is an axial section through a brake embodying the features of the invention;

Figure 2 is a section taken along the line 2—2 of Figure 1;

Figure 3 is a section taken along the line 3—3 of Figure 1;

Figure 4 is a section taken along the line 4—4 of Figure 1;

Figure 5 is a horizontal section taken along the line 5—5 of Figure 1; and

Figure 6 is a detail elevational view of the portion of the brake actuating mechanism.

Referring now in detail to the several figures, the numeral 1 represents the end portion of a vehicle axle in the axle housing 2. Fixed to the axle is the wheel hub 3 which carried the rotatable portion of the brake while a flange 4 is fixed to the axle housing and as will be seen carries the stator 5 which corresponds to the brake drum.

Figure 2 shows that the stator 5 has an outwardly cylindrical ring f' having an inner periphery which is cylindrical along the opposite arcs 6 and 7 and formed with inwardly extending portions 8 and 9 at diametrically opposite points. The rotor consists of a cylindrical member 10 bolted as at 11 to the flange 12 of the wheel hub. The rotor is of such diameter that it touches the projecting portions 8 and 9 of the stator as shown in Figure 2, defining with the stator the oil chambers 13 and 14. At one hundred and twenty degree intervals, the rotor is provided with radial slots 15, 16 and 16' in which play the radially extensible vanes 17, 18 and 18'. The outer ends of said vanes bear against the inner periphery of the stator while the lateral edges of said vanes play in grooves 19, 20 and 20' formed in the side walls of the slots. The vanes are normally held in sealing contact with the inner periphery of the stator by positive means as follows:

The stator is deeply rabbeted on the outside forming a cylindrical bearing 44 for the sliding ring 45. At suitable points the bearing is provided with splines 46 and 47 which interdigitate with corresponding grooves formed on the lower surface of the ring. The ring is slidable in or out under the control of certain operating mechanism to be described. The vanes 17, 18 and 18' are each provided on one side with an outwardly and upwardly radially extending arm 48, the upper end 49 of which turns inwardly so as to engage the sloping cam surface 50 of the ring 45. When the ring 45 moves outwardly it lifts the arms 48 raising the vanes. As the ring 45 moves inwardly the arms ride down the inclined slope 50 and the vanes descend. Springs 51 attached to the arms and anchored in the hub of the rotor bias the vanes in the direction of retraction.

A rod 52 is secured to the ring 45 and passes through a guide aperture 53 in the vertical surface of the rabbet. The inner portion of the rod 52 extends through an enlarged counterbore 54 in the flange 4. The end of the rod has a head 55, and a spring 56 confined within the counter-bore normally presses against the head and biases the rod in a direction which draws the ring inwardly.

The rod 52 is reciprocated by means of a pivoted cam 57, one portion of which engages the head 55. The opposite side of said cam is in engagement with a rocking lever 58 under the control of an operating rod 59. When the brake is applied, the rocking lever is moved in such direction as to push the cam 57 against the head 55 and cause the ring 45 to move outwardly lifting the arms 48 and the vanes 17, 18 and 18'. When the brake is to be released, the rocking lever is moved in the opposite direction freeing the cam 57 and permitting the rod to be retracted under the expansion of the spring 56.

The conicity of the ring 45 is not regular throughout for at points opposite the elevations 8 and 9 it is formed with sags or hollows 60 and 61, see Figure 2, of such contour that regardless of the position of the ring, it will let the vanes down precisely to the point at which they will follow the curvature of the elevations 8 and 9. As a matter of fact, as will appear from Figure 2, the contour of the sags is so designed as to let the vanes fall away slightly from the surface of the elevations on the ascending side up to approximately the point of tangency of the elevations to the rotor, that no body of oil will be trapped between the vanes and the elevations on the ascending side of said elevations.

At the sides of the vane slots, the rotor is provided with radially extending flanges 24 which embrace the sides of the stator 5. Preferably, in order to produce a fluid-tight joint, the stator is provided with circumferential ribs which interdigitate with corresponding grooves in the rotor flanges 24 and 25.

For ease in assembling, the rotor is formed with a detachable ring 62 on one side which ring is removed to permit the stator 5 to be pushed into contact with the far side of the rotor. The ring 62 carrying one of the grooves which receives one of the flanges 24 may then be screwed into place. At one hundred and twenty degree intervals, that is to say, at intervals which are in the same planes as the vanes, the side of the rotor is formed with a slot 63 extending into the rotor chamber and at least as high as the length of the vane. This is to permit the vane to be slipped into place. The side of the rotor, in the same planes is provided with a longer slot 64 which slot is continued through the casing and through the annular portion of the wheel flange 12. The casing as well as the wheel and wheel flange 12 are not assembled until after the vanes are in place. The last mentioned slot 64 is to give play to the vertical portions of the arms. Small wells 65 are formed in the hub of the rotor 10 having opposite disposed lateral pin slots. The spring 51 which is attached at one end to the arm 48 extends into the well 65 where it is anchored to a pin 67 which is sealed in the pin slots and bridges the well. After the springs are in place a cover plate 68 is screwed on.

The casing 41 is next assembled; the flange 32 thereof being slipped upon the cylindrical portion of the wheel flange 12, with the packing rings 33 and 34 in place. Thus a fluid-tight joint is made between the rotating wheel and the fixed casing. The wheel flange 12 is as stated, necessarily slotted as at 70 at three points spaced one hundred and twenty degrees apart. In assembling, the wheel flange 12 is oriented so that said slots correspond in position to the position of the arms and it is then pushed into place and bolted by means of the bolts 11. The wheel is positioned upon the projecting studs and secured by the nuts.

Referring to Figure 2, it will be understood that when the brake-operating mechanism is applied the vanes 17, 18 and 18' are extended to the position shown in Figure 2, trapping bodies of oil between the vanes and the projecting portions 8 and 9 and since the oil is incompressible the relative movement between the stator and rotary member is inhibited. An extreme braking action such as this would of course lock the wheels. In general, the brake-operating mechanism will be applied more gradually so that the space between outer ends of the vanes 17 and 18 will be progressively diminished according to the braking needs.

Suitable means are provided to prevent leakage at all points at which leakage might occur. Notwithstanding this, in time, or for one reason or another, there might be a certain depletion of oil in the oil chamber between the rotary member and stator, and which would create an uncertain response of the brake to the initial movement of the brake-operating mechanism. In order to prevent such depletion and to assure that at all times the oil chamber shall be full, the brake is provided with a casing or jacket, in general designated by the reference character 26, the lower portion of which may act as an oil reservoir. This communicates by means of passages 27 and 28, the limbs of which are so spaced that they will communicate with the oil body on opposite sides of one of the elevations 8, as shown in Figure 3. Rotation of the brake mechanism creates a vacuum in the oil spaces if they are not filled and automatically draws up oil from the reservoir past a check valve 29.

Since there is certain tolerance in the axle bearings of any auto vehicle, the wheel in rotating is continually axially displaced through a small angle relative to the axle housing and it is obvious that if the rotor which is rigid with the wheel makes such movements, and the stator which is rigid with the axle housing does not, that the vanes cannot be counted upon to make a true joint with the inner face of the stator which they engage nor can the joints between the flanges 24 and 25 of the rotary member and the cooperating ribs of the stator be maintained in true and oil-tight alignment. Therefore in order that the stator may follow the movements of the rotary member, the connection between the rigidly mounted flange 4 and the stator 5 is a toothed or splined connection as is indicated in Figures 1 and 4, the teeth 30 and 31 on the flange 4 and stator 5, respectively, being a free fit so as to allow for a slight relative rocking motion on the part of the stator.

An oil-tight casing 41 preferably encloses the relatively movable parts of the brake mechanism. This casing has a flange 32 journalled on a cylindrical flange 42 on the outer part of the wheel hub flange 12. Sealing rings 33 and 34 make a fluid-tight joint at this point. The casing has a relatively thin encompassing portion 35 terminating in a flange 36 which bolts to the fixed flange 4, a packing 37 intervening. The encompassing portion 35 is corrugated as at 38 so that it can readily distort under stress. This accommodates the relative motion between the fixed and rotary portions of the brake.

It will be understood from Figures 2 and 3 that the provision of three vanes symmetrically displaced, assures that at least two will always be in readiness to perform the braking action while one may be between the divided ports of the oil replenishing passage.

While I have in the above description disclosed what I believe to be a preferred and practical embodiment of my invention, it will be understood to those skilled in the art that the specific details as described and illustrated are merely by way of example and not to be construed as limiting the scope of the invention as claimed.

What I claim is:

1. In combination with an auto vehicle wheel and axle housing, a fluid brake comprising a rotor rotatable with the wheel and a stator fixed with respect to the axle housing, said rotor including a cylindrical hub with side flanges and said stator including a ring embraced by said side flanges in fluid-tight manner, the inner face of said ring having opposite portions closely engaging said hub and having intermediate opposite portions off-set from said hub forming therewith liquid chambers, the capacity of which does not change in the normal relative rotation between said stator and rotor, vanes carried by the rotor at symmetrical points, projectable to greater or less extent into the liquid chamber, upon braking occasion, for constricting liquid between said stator and rotor, retarding the latter.

2. Combination as claimed in claim 1, including positive means for controlling the extent of projection of the vanes and spring means for effecting their withdrawal.

3. In combination with an auto-vehicle wheel and axle housing, a fluid brake comprising a rotor rotatable with the wheel partaking of the deviatory movements of the wheel, and a stator fixed with respect to the axle housing, said rotor including a cylindrical hub with side flanges and said stator including a ring embraced by said side flanges in fluid-tight manner, the inner face of said ring having opposite portions closely engaging said hub and having intermediate opposite portions off-set from said hub forming therewith liquid chambers, the capacity of which does not change in the normal relative rotation between said stator and rotor, vanes carried by the rotor at symmetrical points projectable to greater or less extent into the liquid chamber, upon braking occasion, for constricting liquid between said stator and rotor, retarding the latter, said ring being flexibly mounted with respect to said axle housing permitting it to partake of the said deviatory movements of said rotor.

4. In combination with an auto vehicle wheel and axle housing, a fluid brake comprising a rotor rotatable with the wheel and a stator fixed with respect to the axle housing, said rotor including a cylindrical hub with side flanges, and said stator including a ring embraced by said side flanges, said ring and flanges co-engaging by means of a fluid-tight tongue and groove slip joint, the inner face of said ring having opposite portions closely engaging said hub and having intermediate opposite portions off-set from said hub forming therewith liquid chambers, the capacity of which does not change in the normal relative rotation between said stator and rotor, vanes carried by the rotor at symmetrical points projectable to greater or less extent into the liquid chambers, upon braking occasion, for constricting liquid between said stator and rotor, retarding the latter.

5. In combination with an auto vehicle wheel and axle housing, a fluid brake comprising a rotor rotatable with the wheel and partaking of the deviatory movements of said wheel, and a stator including a flange fixed with respect to the axle housing, and a ring connected to said flange with sufficient lost motion to enable it to follow the deviatory movements of said rotor, said rotor including a cylindrical hub with side flanges embracing said ring in fluid-tight manner, the inner face of said ring having opposite portions closely engaging said hub and having intermediate opposite portions off-set from said hub forming therewith liquid chambers, the capacity of which does not change in the normal relative rotation between said stator and rotor, vanes carried by the rotor at symmetrical points projectable to greater or less extent into the liquid chambers, upon braking occasion, for constricting liquid between said stator and rotor, retarding the latter.

6. Combination as claimed in claim 5, including positively operating means for controlling the extent of projection of said vanes and spring means for withdrawing them.

7. In combination with an auto vehicle wheel and axle housing, a fluid brake comprising a rotor rotatable with the wheel partaking of the deviatory movements of said wheel, and a stator including a flange fixed with respect to the axle housing, and a ring loosely splined to said flange with sufficient freedom of motion to enable it to follow the deviatory movements of said rotor, said rotor including a cylindrical hub with side flanges embracing said ring in fluid-tight manner, the inner face of said ring having opposite portions closely engaging said hub and having intermediate opposite portions off-set from said hub forming liquid chambers, the capacity of which does not change in the normal relative rotation between said stator and rotor, vanes carried by the rotor at symmetrical points projectable to greater or less extent into the liquid chambers, upon braking occasion, for constricting liquid between said stator and rotor, retarding the latter.

8. In combination with an auto vehicle wheel and axle housing, a fluid brake comprising a rotor rotatable with the wheel partaking of the deviatory movements thereof, and a stator including a flange fixed with respect to the axle housing, and a ring loosely splined to said flange with sufficient freedom of movement to enable it to partake of the deviatory movements of said rotor, said rotor including a cylindrical hub with side flanges embracing said ring in fluid-tight manner, the inner face of said ring having opposite portions closely engaging said hub and having intermediate opposite portions off-set from said hub forming liquid chambers, the capacity of which does not change in the normal relative rotation between said stator and rotor, vanes carried by the rotor at symmetrical points projectable to greater or less extent into the liquid chambers, upon braking occasion, for constricting liquid between said stator and rotor, retarding the latter, said rotor having an external cylindrical seat, and a casing on one side, fitting said seat in fluid-tight manner and on the other side being secured to said fixed flange, said casing having a flexible intermediate portion enabling it to partake of the deviatory movements of said rotor.

9. Combination as claimed in claim 8, the lower part of said casing being a reservoir for make-up liquid, a branched conduit placing said reservoir in communication with said liquid chambers, and check valves in the branches of said conduit opening toward said chambers whereby said rotor in the course of its normal rotation acts as a pump in keeping said liquid chambers filled from said reservoir.

ABRAM H. WOOD.